United States Patent [19]
Ishida et al.

[11] Patent Number: 5,447,024
[45] Date of Patent: Sep. 5, 1995

[54] CHEMICAL-LOOPING COMBUSTION POWER GENERATION PLANT SYSTEM

[75] Inventors: Masaru Ishida, Yokohama; Hongguang Jin, Machida, both of Japan

[73] Assignee: Tokyo Electric Power Co., Inc., Japan

[21] Appl. No.: 336,092

[22] Filed: Nov. 7, 1994

Related U.S. Application Data

[63] Continuation of Ser. No. 46,166, Apr. 15, 1993, abandoned.

[30] Foreign Application Priority Data

Jun. 3, 1992 [JP] Japan .................. 4-142363

[51] Int. Cl.⁶ .............................. F02G 3/00
[52] U.S. Cl. ................ 60/39.05; 60/39.461; 60/39.464
[58] Field of Search ............ 60/39.02, 39.464, 39.461, 60/39.53, 39.05

[56] References Cited

U.S. PATENT DOCUMENTS 4,537,023 8/1985 Nakamura et al. ............... 60/39.05

FOREIGN PATENT DOCUMENTS 1040571 10/1958 Germany ........................... 60/39.461
2332348 1/1975 Germany ........................... 60/39.461

OTHER PUBLICATIONS

"Energy", vol. 12, No. 2, pp. 147–154, 1987.
1983 Tokyo International Gas Turbine Congress, pp. 297–303, Mori et al.

*Primary Examiner*—Richard A. Bertsch
*Assistant Examiner*—William Wicker
*Attorney, Agent, or Firm*—Lorusso & Loud

[57] ABSTRACT

A chemical-looping combustion method uses a metallic oxide (MO) as an oxygen carrier. A fuel (RH) reduces MO at a low temperature in a first reactor, a reduced product (M) is oxidized by oxygen in moistened air in a high-temperature region in a second reactor to form MO which is recycled to the first reactor. Heat generated within these reactors is utilized to drive gas turbines. The reactions within the first and second reactors are:

$$RH + MO \rightarrow mCO_2 + nH_2O + M \qquad (1)$$

$$M + 0.5O_2 \rightarrow MO \qquad (2)$$

Moistened air is the oxygen source in the second reaction. The metallic oxides and their reduced products are particulates including an oxygen permeable medium. The loss of energy in the conversion reactions and in heat exchange is reduced, power generation efficiency is improved, $CO_2$ is recovered and water resources are saved.

13 Claims, 3 Drawing Sheets

CHEMICAL-LOOPING COMBUSTION POWER GENERATION PLANT SYSTEM

This application is a continuation of application Ser. No. 08/046,166, filed Apr. 4, 1993, now abandoned.

FIELD OF THE INVENTION

The present invention relates to a gas turbine power generation plant system employing a chemical-looping combustion method and to solving environmental problems by recovering and utilizing carbon dioxide produced as a by-product in the power generation plant system.

PRIOR ART

A power generation plant employing a gas turbine cycle is advantageous since it can work at a higher temperature than a steam turbine cycle utilizing steam. Though a gas turbine cycle using high-temperature air as a working medium has a simple structure, it has a problem in that, because it wastes the exhaust gas generated in a middle-temperature region, its thermal efficiency is poor. Therefore, studies for improving the combustion method have been made in order to improve power generation efficiency for saving fuel resources. In one such gas turbine cycle, air for the combustion of a fuel is moistened and then used to burn the fuel directly, with the exhaust gas being supplied into a turbine ("A highly efficient regenerative gas turbine system by a new method of heat recovery with water injection," Y. Mori et al., 1983, Tokyo International Gas Turbine Congress, p. 297, U.S. Pat. No. 4,537,023). According to the foregoing air-moistened direct combustion method, it becomes possible to decrease an average temperature difference between exothermic fluid and endothermic fluid in a heat exchange system and to decrease losses in energy conversion, and consequently thermal efficiency is improved. The above-mentioned paper teaches that the power generation efficiency according to this method is about 52.8%.

However, though a power generation plant system utilizing the above-described air-moistened direct combustion method has high power generation efficiency and is effective in saving energy resources, it does not take into consideration the carbon dioxide produced by the combustion of fuels at high temperature. In addition, it needs a large amount of purified water and is wasteful of water resources. Water is contained in the exhaust gas as water vapor and contains impurities derived from the fuels. If cooled in a heat exchanger or the like, that apparatus will be corroded; accordingly, it has been impossible to condense the water vapor to recover the water. Accordingly, unless there are sufficient water resources, such a conventional power generation plant system utilizing water may not be put to practical use. Since carbon dioxide produced by the direct combustion of a fuel is diluted with a large amount of gas, it is not recovered.

The present inventors have developed a gas turbine power generation plant system employing a chemical-looping combustion method of improved power generation efficiency, described in "Evaluation of a chemical-looping combustion power generation system by graphic energy analysis," M. Ishida et al., Energy, Vol. 12, No. 2, p. 147, 1987. The chemical-looping combustion method involves two continuous reactions as shown in the following formulae (1) and (2). The reduction product (M) of a metallic oxide (Mo) obtained according to the formula (1) is utilized in the oxidation reaction of the formula (2). Therefore, it is a chemical-looping reaction with MO as an oxygen carrier. The reaction of the formula (1) is an endothermic reaction of MO and a fuel (RH) with low-level energy absorption in a low-temperature region (about 600–1,000 K.) and the reaction of the second step is an exothermic oxidation of the reaction product. (M) of the first step in a high-temperature region (about 800–1,700 K.). A high-temperature exhaust gas is produced by the heat of the reaction and is utilized for driving a gas turbine.

$$RH + MO \rightarrow mCO_2 + nH_2O + M \quad (1)$$

$$M + 0.5O_2 \rightarrow MO \quad (2)$$

where M represents a reduction product of MO and is exemplified by metals such as iron (divalent, trivalent), nickel copper, manganese, etc.

In the prior art chemical-looping combustion method the energy loss in high-temperature and middle-temperature regions (about 700–1,200 K.) is small. However, though a large amount of heat in the low-temperature region (about 400–600 K.) is generated, the heat is only used for heating a small amount of water and a large amount of the low-temperature heat remains unused and, therefore, the power generation efficiency remains 50.2%.

Moreover, in the actual practice of the reactions of the formulae (1) and (2), as the metallic oxide is used repeatedly, the rate of the reaction in the second step decreases and the power generation efficiency lowers. Thus, it could not be put to practical use.

Further, though the prior art chemical-looping combustion power generation plant system recovers a small amount of water produced by the oxidation of hydrogen in the fuel, it does not take advantage of the fact that the exhaust gas from the reactor for the reaction of the formula (2) is clean and can be cooled to a low temperature. Moreover, no attempt has been made to recover or utilize carbon dioxide.

As mentioned above, a power generation plant employing a gas turbine system employing a combustion method using moistened air takes no account of carbon dioxide produced by the combustion of fossil fuels and is wasteful of water resources. In addition, since the above air-moistening direct combustion power generation plant system can decrease the average temperature difference in a low-temperature-level heat exchange, the energy loss is small. In a high-temperature heat exchange, however, the temperature difference is large and there remains the problem of a large energy loss.

Further, the above-mentioned chemical-looping combustion power plant system is not only incapable of high power generation efficiency but also has a slow reaction rate in the second step shown in formula (2). Therefore, it has not been put to practical use. Thus, when a chemical-looping combustion method or a direct combustion method using moistening air is employed independently in a power generation system, it is wasteful of energy and incapable of recovering carbon dioxide and water.

SUMMARY OF THE INVENTION

An object of the present invention is to provide a gas turbine power generation plant system which has improved efficiency of power generation by use of a new chemical-looping combustion method.

Further, another object of the present invention is to provide a gas turbine power generation plant system which is capable of decreasing cost by recovering carbon dioxide and water and, therefore, is practical.

The present invention is a chemical-looping combustion power generation plant system, wherein gases exhausted from a first reactor for reaction of a fuel and a metallic oxide and from a second reactor which produces a metallic oxide, for use in the first reactor, by oxidizing the product of reduction of the metallic oxide produced in the first reactor are introduced into gas turbines of a gas turbine power generation plant, and wherein air introduced into the second reactor is first moistened.

Here, gas exhausted from the second reactor is utilized in a gas turbine and then finally cooled to recover water. Further, the gas exhausted from the first reactor, after utilization in a gas turbine and cooling, is processed to produce a concentrated carbon dioxide gas.

The metallic oxides and their reduction products cycling between the first reactor and the second reactor can be used in particulate forms and stabilized by means of an oxygen permeable medium.

in the chemical-looping combustion method of the present invention, using a metallic oxide (MO) as an oxygen carrier, a fuel reduces MO at a low temperature (reaction formula (1)) and the product of this reduction (M) is oxidized by oxygen at a high-temperature (reaction formula (2)). MO produced by the reaction formula (2) is utilized in the reaction formula (1). Heat obtained by these reactions is utilized in a gas turbine.

FIG. 2 and FIG. 3 are graphs showing the utilization of heat in a low-temperature region in the power generation of the present invention (FIG. 2) and power generation utilizing steam (FIG. 3).

As can be seen in FIGS. 1 and 2, according to the present invention, the average temperature difference between exothermic fluid and endothermic fluid in heat exchange systems can be decreased by using moistening air in the reaction formula (2), as compared with that of a steam-utilizing method. In addition, the loss of energy in heat exchange (corresponding to the area with oblique lines between the curve of the exothermic fluid side and that of the endothermic fluid side shown in FIG. 2 and FIG. 3, respectively) can also be decreased.

on the other hand, utilization of heat in a high-temperature region is shown in FIG. 4 for the power generation of the present invention and in FIG. 5 for power generation. In the direct combustion method using moistened air (FIG. 5), the theoretical reaction equilibrium temperature in the direct combustion of a fuel becomes 10,000° C. or more. If it is utilized to heat an endothermic fluid, which is usually 1,200° C., the temperature difference becomes too large and therefore the loss of energy in heat exchange also becomes large. On the contrary, according to the chemical-looping combustion method of the present invention, utilizing the above reaction formulae (1) and (2), the theoretical reaction equilibrium temperature of the oxidation of a reduced product (M) in a high-temperature region (reaction formula (2)) lowers to 3,000 K. (about 2,700° C.) and the difference with the temperature of endothermic fluid (1,200° C.) becomes small. Accordingly, the loss of energy in heat-exchange is reduced.

In a prior art system using moistening air, though loss of energy in energy conversion is small in middle- and low-temperature regions, it is large in a high-temperature region. On the other hand, in a conventional chemical-looping combustion method, though the loss of energy in energy conversion is small in high- and middle-temperature regions, it is large in a low-temperature region.

In the present invention, the defects of both systems are overcome by combining them synergistically and the loss of energy in energy conversion can be reduced over the entire range from a high-temperature region to a low-temperature region.

In addition, the rate of the reaction in the second step can be maintained high by using an oxygen permeable medium, to retain the particulate form of a metallic oxide and its reduced product, cycling between the first reactor and the second reactor, even after a large number of cycles.

Thus, the efficiency of power generation is improved by the present invention. In the present invention, not only does it becomes possible to recover carbon dioxide and water, but also the efficiency of power generation is improved, beyond that obtained by either system independently, by combining a chemical-looping combustion method with moistening of air and, in addition, utilizing an oxygen permeable particulate medium.

According to the present invention, in which chemical-looping combustion and the moistening of air are combined, not only can carbon dioxide and water be recovered, but also power generation efficiency can be improved beyond that obtained with either system independently.

Moreover, according to the present invention, strength and reaction rate can be improved by utilizing metallic oxide particles containing an oxygen permeable medium.

DESCRIPTION OF THE PREFERRED EMBODIMENTS

Preferred embodiments of the present invention will now be described with reference to the drawings.

Figure 1:
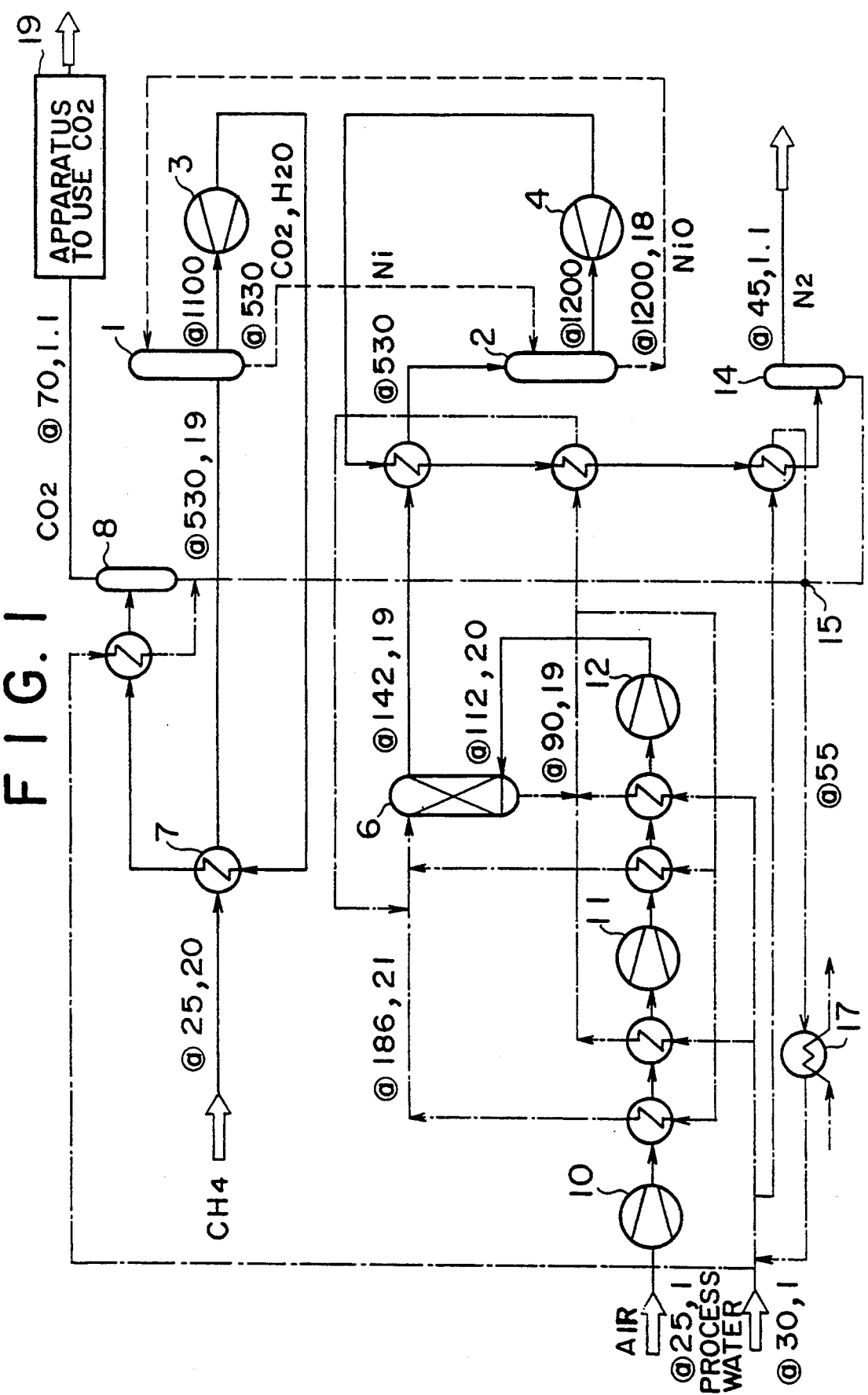
FIG. 1 is a schematic diagram of a power generation utilizing an embodiment of the present invention.
Figure 2:
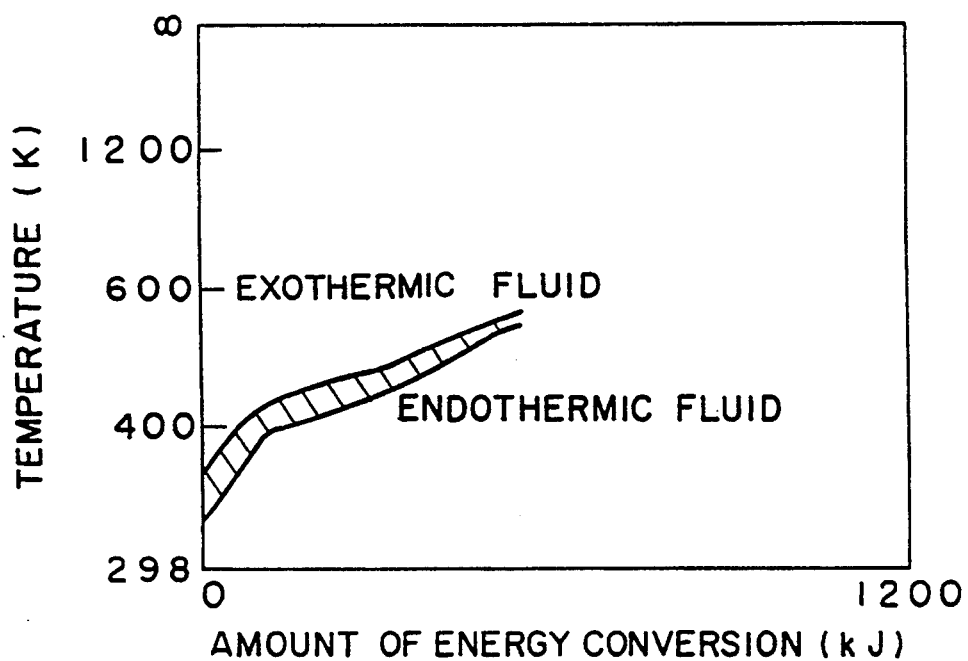
FIG. 2 and FIG. 3 are graphs showing the utilization of heat in middle- and low-temperature regions, by the present invention and the prior art, respectively.
Figure 3:
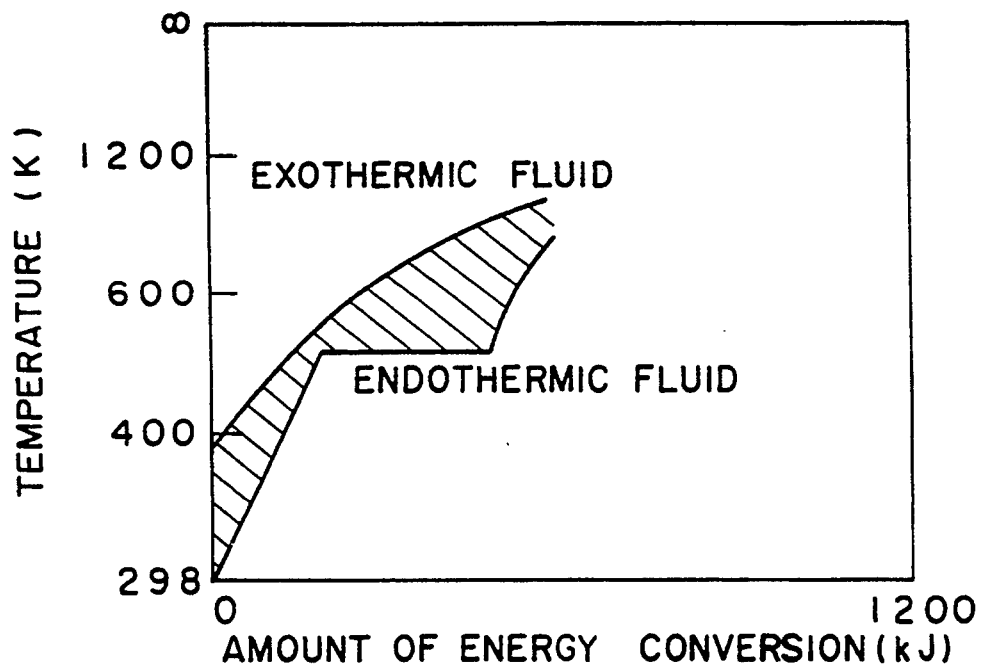
Figure 4:
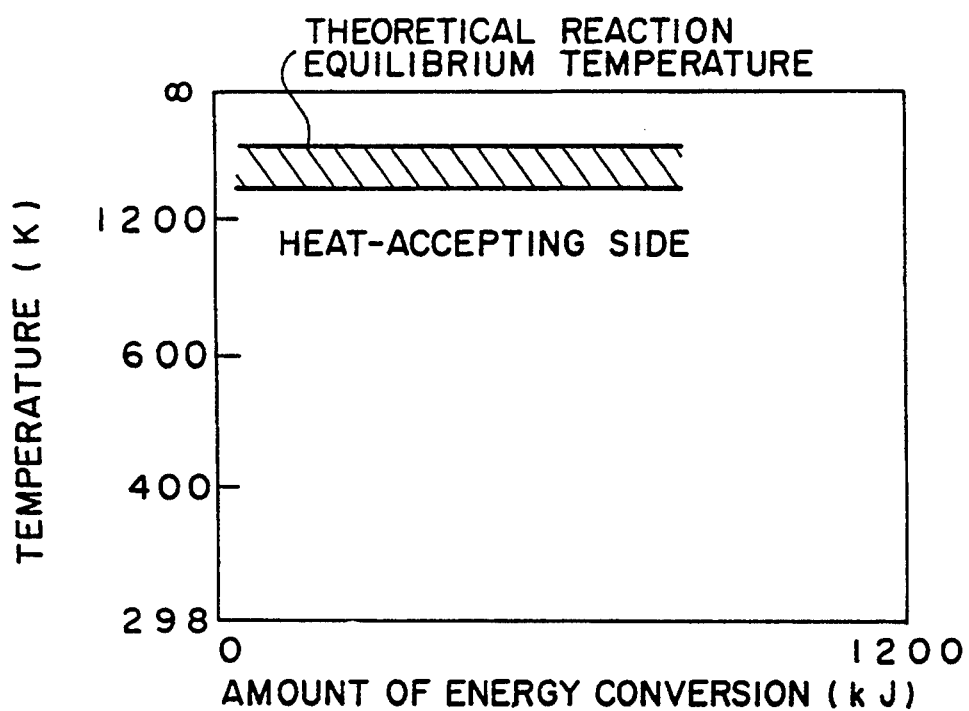
FIG. 4 and FIG. 5 are graphs showing the utilization of heat in a high temperature region, by the present invention and the prior art, respectively.
Figure 5:
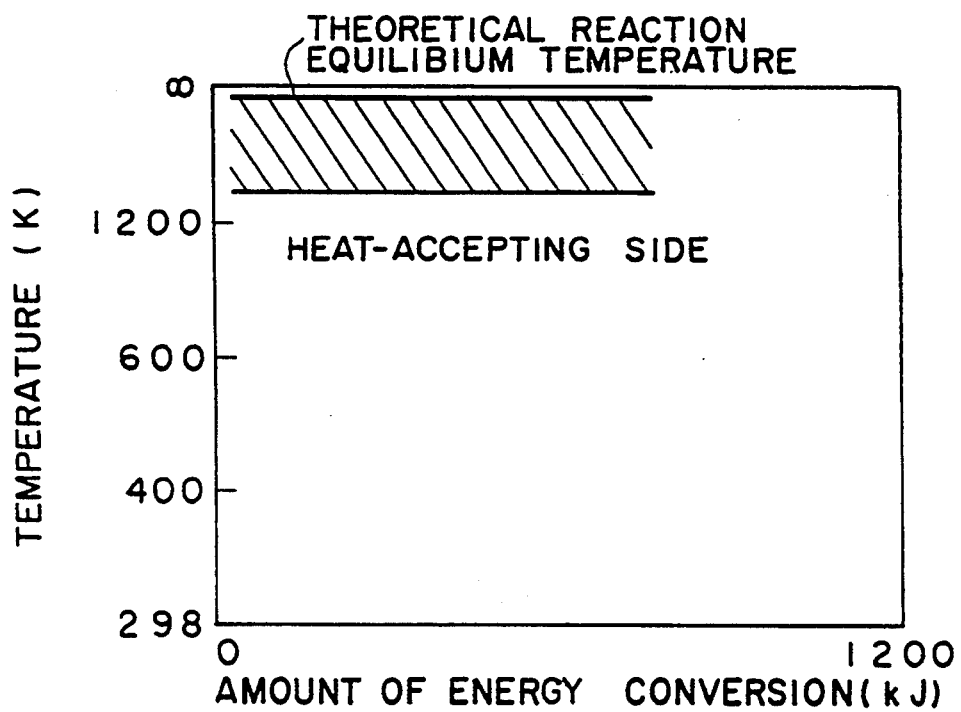

In the embodiment of a chemical-looping combustion method of the present invention shown in FIG. 1, methane is used as a fuel and a nickel oxide as a metallic oxide. Accordingly, the reactions of the following two reaction formulae (3) and (4) are carried out in the reactor 1 and the reactor 2, respectively.

$$CH_4 + 4NiO \rightarrow CO_2 + 2H_2O + 4Ni \qquad (3)$$

$$4Ni + 2O_2 \rightarrow 4NiO \qquad (4)$$

In the reactor 1, methane as a fuel reacts with an oxide (NiO), instead of a combustion reaction with oxygen contained in air. In the reactor 2, a reduced product (Ni) reacts with oxygen contained in air. Accordingly, a fuel (CH$_4$) and air separately enter the reactor 1 and the reactor 2, respectively, and the products of the reactions are separately discharged from each of the reactors 1 and 2. Thus, the present invention is quite different from the prior art in that a fuel does not react with air directly.

The gases obtained in the reactors 1 and 2 are separately utilized in gas turbines 3 and 4, respectively. The gases discharged from the gas turbines 3 and 4 are cooled by heat exchange and then carbon dioxide and water are recovered and utilized, and the remainder of the gases is discharged into the atmosphere.

As shown in FIG. 1, air moistened in advance is transferred into the reactor 2, part of its oxygen content is used for oxidizing a metal in the reactor 2 and the remaining air is thereby heated by the heat of the oxidation reaction to produce a high temperature exhaust gas which is introduced into the gas turbine 4 wherein it is cooled and the moisture therein is condensed and recovered as water.

Another characteristic of the present invention is that since the gas discharged from the reactor 2 has not contacted impurities from the fuel or combustion, the water vapor it contains can be condensed and recovered without corroding apparatus. An air-moistener 6 is provided between the point of introduction of the air and the reactor 2 and the moistened air is used for the oxidation of nickel in the reactor 2.

Next, the flow chart of FIG. 1 will be described. Methane, at 25° C. and a pressure of 20 atm, is introduced for heat-exchange with an exhaust gas from the gas turbine 3 in the heat exchanger 7, to raise its temperature to 530° C. with a pressure of 19 atm, and is then introduced into the reactor 1. The reactor 1 is cyclically supplied with nickel oxide at 1,200° C. from the reactor 2 (the flow of nickel oxide and nickel is shown with broken lines). The nickel oxide is reduced to nickel according to the endothermic reaction of the formula (3) by methane and the nickel is supplied into the reactor 2.

The products discharged from the reactor 1 are carbon dioxide, water vapor and solid nickel. Solid nickel is easily separated from the products. The exhaust gas discharged from the reactor 1 (carbon dioxide and water vapor) expands and generates power at 1,100° C. in the gas turbine 3 whereby its temperature is lowered. It is further cooled by heat exchange with methane in exchanger 7 and then with process water in exchanger 20. Moisture is removed in a condenser 8 and carbon dioxide with a temperature of 70° C. and a pressure of 1.1 atm is recovered. The carbon dioxide is utilized in apparatus 19.

In the present invention, nothing special is required as energy sources for recovering carbon dioxide from the exhaust gases. The heat recovered by cooling a high-temperature exhaust gas discharged from the reactor 1 is utilized for efficiently heating process water or methane.

The air with a temperature of 25° C. and a pressure of 1 atm to be used in the present embodiment is first compressed to a pressure of 20 atm by means of multi-stage compressors 10–12 in order to satisfy the demand for minimizing compression power and the demand for heat in the moistener 6, heat-exchanged with water discharged from the moistener 6 and process water in sequence, heated to a pressure of 20 atm and a temperature of 112° C., and supplied into the moistener 6. Water at a temperature of 186° C. and a pressure of 21 atm is supplied from the top of the moistener column 6. The air is moistened with water to obtain moistened air at a temperature of 142° C. and a pressure of 19 atm (volume fraction of steam: about 25%). The air is further heated to 530° C. by heat exchange with an exhaust gas from the reactor 2 and then introduced into the reactor 2. In the reactor 2, nickel supplied from the reactor 1 is oxidized by the moistened air. Since the reaction in the reactor 2 is an exothermic reaction, an exhaust gas at 1,200° C. can be obtained from the reactor 2.

The main component of the exhaust gas is nitrogen. Since this gas is not corrosive upon cooling, a cheap material can be utilized for the apparatus of the reactor 2. When a conventional process for the combustion of a fuel is employed, sulfur oxides in the exhaust gas produced by combustion become corrosive by condensation of water vapor and therefore measures must be taken to prevent corrosion. In the present embodiment, the exhaust gas produced in the reactor 2 employing air is a non-corrosive gas with nitrogen gas as a main component. Accordingly, water can be recovered by condensation and, as mentioned above, a cheap material can be utilized for the reactor 2 and its surrounding apparatus.

The exhaust gas at 1,200° C. from the reactor 2 is utilized in the gas turbine 4. The exhaust gas from the gas turbine 4 is utilized for heating introduced air and then cooled with process water. Moisture is condensed in the condenser 14 and recovered. The rest is discharged into the atmosphere as a gas comprising nitrogen at a temperature of 45° C. and a pressure of 1.1 atm as a main component.

It is also a feature of the present embodiment that the nickel oxide obtained by the reaction in the reactor 2 is solid and easily separated from the components of the exhaust gas. The nickel oxide discharged from the reactor 2 also has a temperature of 1,200° C. and is transferred to the reactor 1 by gravity.

Process water shown with dash-dotted lines is utilized to condense water vapor by cooling of the exhaust gas from the reactor 1, to condense water vapor by cooling of the exhaust gas from the reactor 2 and for the intercooling of air whose temperature has been raised by compression in compressors 10–12. Process water condensed by condensers 8 and 14 flows together at the junction 15 to become 55° C., is cooled by means of a heat exchanger 17 and utilized as process water again. Thus, since water is recovered and reused in the present invention, it is not wasteful of water resources.

As the number of cycles of nickel or a nickel oxide between the reactor 1 and the reactor 2 increases, it tends to become powdered and to lose its reactivity. Its oxidation rate also tends to become reduced. However, when the above nickel or nickel oxide is admixed with an oxygen permeable material, it shows good results. For example, a nickel oxide may be mixed with yttrium-stabilized zirconium (YSZ) ($ZrO_2$ stabilized by the addition of 8% $Y_2O_3$) in the ratio of 3 to 2 (weight ratio) to prepare a particulate material which is sintered at a high temperature. When such a medium with oxygen permeability is added, the nickel or the nickel oxide has structural stability, has sufficient strength for cycling between the reactors 1 and 2 and, therefore, its useful life is extended. In addition, while nickel is usually oxidized slowly since it forms a covering oxide layer, the above nickel can maintain a sufficient reaction rate because oxygen is supplied through the YSZ having oxygen permeability. Thus, the oxidation of the nickel can be completed.

Though nickel oxides are used as metallic oxides in the present embodiment, other oxides such as iron (bivalent, trivalent), copper and manganese can also be used.

In the present embodiment, almost the entire amount of the water supply can be recovered by cooling the exhaust gas from the reactor 2. According to the system of the present embodiment, when water was recovered, a high power generation efficiency of 55.1% could be obtained. When water was not recovered, a power generation efficiency of 56.7% was obtained. These power generation efficiencies are higher by about 2 to 5% than that of the power generation plant disclosed in the above-described prior art report.

Since the chemical-looping combustion method of the present example does not burn a fuel directly, there is no fear of corroding apparatus materials even when the exhaust gas is cooled. According to the conventional method, in which air to be used for the direct combustion of a fuel is moistened, power generation efficiency is improved but a large amount of fresh water is needed, the water is contaminated by impurities from the fuels and, if cooled to a low temperature, will corrode a heat exchanger. Therefore, it heretofore has been impossible to condense and recover water. Accordingly, unless there are sufficient water resources, a conventional system utilizing water cannot be put to practical use, and water cannot be recovered. In the present invention, since water is utilized only cyclically in a closed system, it can be utilized even where water resources are poor.

Moreover, in the direct combustion of a fuel, since carbon dioxide in the exhaust gas is diluted with nitrogen, which is the main component of air, concentration and separation of the diluted carbon is not feasible either technically and economically. In the present invention, since the reaction formula (3) discharges only carbon dioxide and water vapor, moisture can be removed by cooling and carbon dioxide can easily be recovered.

What is claimed is:

1. A chemical-looping combustion power generation method, utilizing first and second reactors, said method comprising:
    reacting a hydrocarbon fuel with a metallic oxide in said first reactor to produce a first off gas containing carbon dioxide and water and to reduce at least a portion of said metal oxide to a reduced solid product;
    passing said first off gas through a first turbine to drive said first turbine, thereby generating power;
    transferring said reduced solid product to said second reactor;
    introducing air into said second reactor for oxidation of said reduced solid product and production of a second off gas by said oxidation;
    passing said second off gas through a second turbine to generate additional power;
    transferring the oxidized metal from said second reactor to said first reactor; and
    adding water to said air introduced into the second reactor to moisten said air.

2. The method of claim 1 wherein said reduced solid product is elemental nickel and said oxidized metal is nickel oxide.

3. A method in accordance with claim 1 further comprising:
    cooling said second off gas, after passage through said second gas turbine, to condense and separate water.

4. The method of claim 3 further comprising recycling at least a portion of the condensed water to said adding step for use as at least a portion of the water added to said air introduced into the second reactor.

5. The method of claim 1 further comprising:
    cooling said first off gas, after passage through said first turbine, to condense said water and produce concentrated carbon dioxide; and
    recovering said concentrated carbon dioxide.

6. The method of claim 5 further comprising recycling at least a portion of the condensed water to said adding step for use as at least a portion of the water added to said air introduced into the second reactor.

7. The method of claim 5 further comprising:
    cooling said second off gas, after passage through said second gas turbine, to condense and recover water.

8. The method of claim 6 further comprising:
    collecting the water condensed from the off gas from said first turbine and the water collected from the off gas from said second turbine; and
    recycling at least a portion of the collected water to the adding step for use as at least a portion of the water added to said air introduced into the second reactor.

9. The method of claim 1 wherein said metal oxide and reduced solid product contain an oxygen-permeable material and have a particulate form stabilized by said oxygen-permeable material, said oxygen-permeable material also serving to improve the oxidation rate of said reduced solid product.

10. A method in accordance with claim 9 wherein said oxygen-permeable material is $ZrO_2$, stabilized with a minor amount of $Y_2O_3$.

11. The method of claim 9 wherein said oxygen-permeable material is $ZrO_2$ stabilized by $Y_2O_3$.

12. The method of claim 9 wherein said reduced solid product is a sintered composite of elemental nickel and said oxygen-permeable material.

13. The method of claim 12 wherein said oxygen-permeable material is $ZrO_2$ stabilized by $Y_2O_3$.

* * * * *

UNITED STATES PATENT AND TRADEMARK OFFICE
CERTIFICATE OF CORRECTION

PATENT NO. : 5,447,024
DATED : September 5, 1995
INVENTOR(S) : ISHIDA et al

It is certified that error appears in the above-indentified patent and that said Letters Patent is hereby corrected as shown below:

On the title page, item [75], Under the Heading "Inventors", after "Machida" insert --Tokyo--.

Col. 2, line 9, after "product" delete the period ".".

Col. 3, line 48, delete "on" insert --On--.

Col. 8, line 21, delete "said";

line 32, delete "6" insert --7--; and line 43, delete "improve" insert --increase--.

Signed and Sealed this

Sixteenth Day of July, 1996

Attest:

BRUCE LEHMAN

*Attesting Officer*     *Commissioner of Patents and Trademarks*